Aug. 29, 1933.  R. T. EDWARDS  1,924,844
SEALING TOOL
Filed July 3, 1929  2 Sheets-Sheet 1
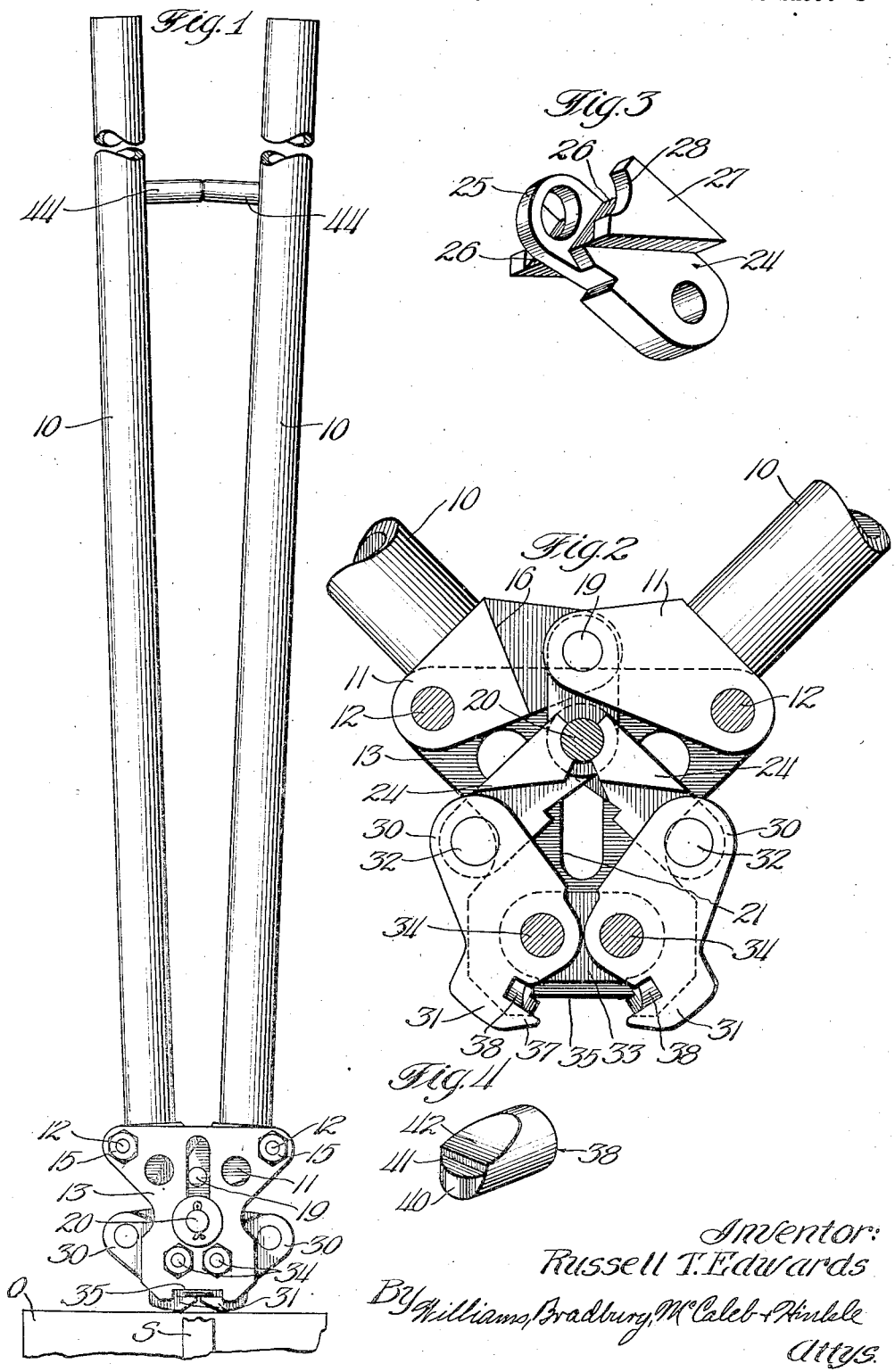
Inventor:
Russell T. Edwards
By Williams, Bradbury, McCaleb + Hinkle
Attys.

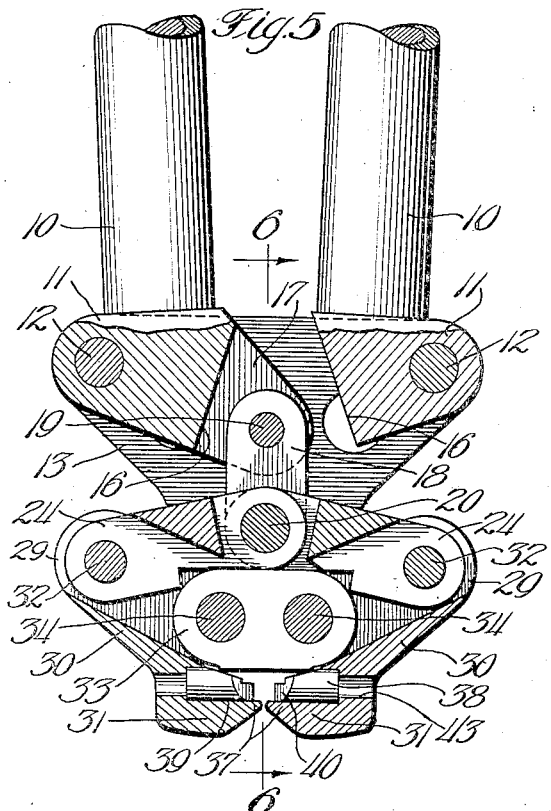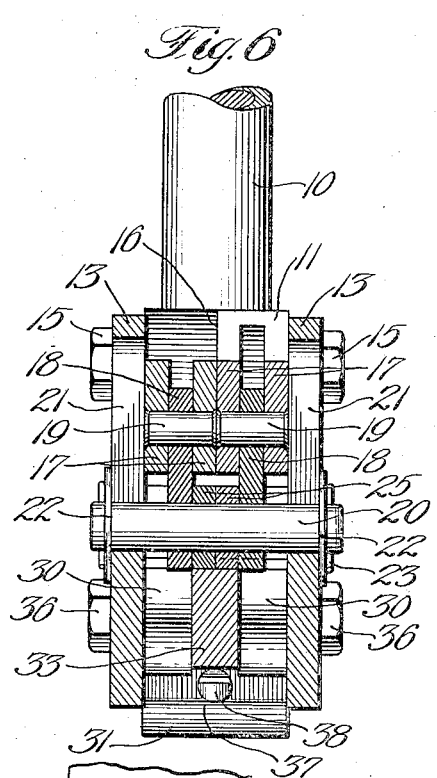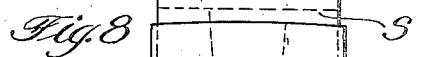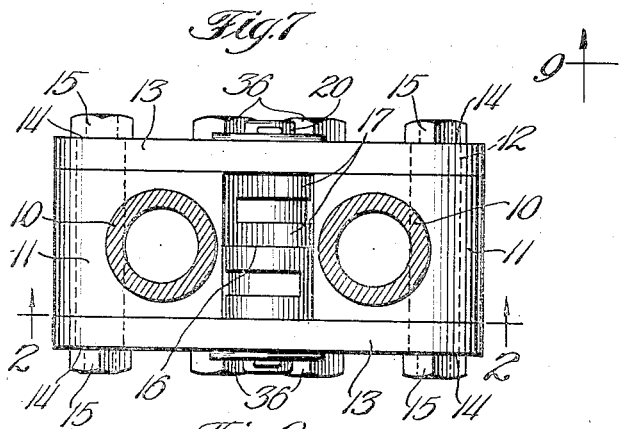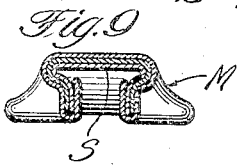

Patented Aug. 29, 1933

1,924,844

UNITED STATES PATENT OFFICE 1,924,844

SEALING TOOL

Russell T. Edwards, Chicago, Ill., assignor to Signode Steel Strapping Company, Chicago, Ill., a corporation of Delaware Application July 3, 1929. Serial No. 375,733

4 Claims. (Cl. 81—9.1)

This invention relates to sealing tools of the type particularly adapted in forming a seal joint to interlock the overlapped ends of steel band strapping used for binding together various objects. For the purpose of illustrating the characteristics of the invention, it will be shown and described as embodied in a tool particularly adapted to produce a seal joint of the general type set forth in the patents to E. E. Flora No. 1,252,680 of January 8, 1918 or J. W. Leslie No. 1,445,330 of February 13, 1923, although of course other types and forms of joints may be produced by modification of the jaws or deforming mechanism.

Among the objects of the invention are to provide a novel sealing tool for quickly deforming the band to interlock the overlapped ends with or without a sleeve forming part of the joint and by which great pressure may be brought upon the band with the application of a minimum of manual force and in which the deforming jaws may be quickly brought to deforming position or retracted from the work; to provide a sealing tool having a novel jaw operating toggle mechanism producing a tool of the front action type, that is, in which the jaws are arranged at one end of the tool transversely to the axes of the handles both of which are pivoted between side plates and connected by a toggle mechanism or jointed structure to the jaws to simultaneously actuate the latter, and which is relatively simple in construction and reliable in operation in addition to being relatively inexpensive to manufacture and in which certain of the moving parts are positively and accurately guided in their movements to insure uniform movements of both jaws simultaneously toward and away from deforming position.

Another object of the invention is to provide a sealing tool of the class described in which the movements of the handles and jaws to open and closed positions, and particularly the latter, especially with respect to the jaws, are positively limited so that jamming of the jaws or the placing of excessive strains on the parts of the toggle linkage or pivotal connections thereof will be positively prevented, the construction being such that the jaws are prevented from coming into actual contact at the completion of the seal joint forming operation.

A further object of the invention is to provide for centralization of the work and equalization of the pressure of both jaws on the work, as well as to insure movement of the jaws in unison and to the same degree in both directions, thus overcoming the tendency of the sealer head to twist as in tools with crossed handles, thereby preventing distortion or mutilation of the joint.

Another object of the invention is the provision in connection with the limiting means of means to positively prevent overloading or excessive strains on the parts of the toggle connections which would otherwise result in distortion of the tool due to the great leverage or tremendous multiplication of power which it is possible to obtain, and to so distribute the effort required on the handles as to accomplish the uneven work done at the jaws with a relatively smooth effort curve and to so distribute the speed of motion of the jaws in relation to the handles that no handle stroke is wasted when the jaws are not doing work, and the motion of the handles is increased in relation to the motion of the jaws when the work done by the jaws increases, and, in general, to decrease and render more uniform, the manual effort expended as compared with the extreme variation in the manual effort required to produce the same or similar work in tools as heretofore constructed.

Other objects and advantages will appear as the description proceeds.

In the accompanying drawings there is illustrated a preferred embodiment of the invention, in which Fig. 1 is a side elevation of the sealing tool in applied position;

Fig. 2 is an enlarged fragmentary sectional elevation of the tool with one side plate removed, the same being taken on the line 2—2 of Fig. 7 and the jaws being shown in a position retracted from the work when the handles are separated;

Fig. 3 is a detail perspective view of a link constituting one of a pair forming part of the toggle mechanism;

Fig. 4 is a detail perspective view of one of the deforming pins;

Fig. 5 is an enlarged fragmentary longitudinal sectional view showing the jaws in deforming position;

Fig. 6 is a sectional view taken on the line 6—6 of Fig. 5;

Fig. 7 is a plan view of the structure as shown in Figs. 5 and 6;

Fig. 8 is a plan view of a seal joint produced by the tool; and

Fig. 9 is a sectional view taken on the line 9—9 of Figure 8.

Referring to the drawings in detail, the sealing tool is shown as comprising a pair of handles 10, preferably tubular and connected at their forward ends to blocks 11 producing in conjunction therewith levers which are pivoted independently at 12 between a pair of side plates 13 adjacent the corners of the widened inner ends thereof. These pivots are preferably in the form of bolts with their end portions extending through holes in the plates and having reduced end portions forming shoulders 14 which are engaged by nuts on the reduced threaded ends to prevent binding engagement of the plates with the levers. The blocks 11 are duplicates and each is cut away at one end as indicated at 16 from one side, while the opposite side is extended angularly and provided with a pair of apertured ears 17 due to the bifurcation of this end. Links 18 are pivoted between each pair of ears 17 as indicated at 19 so as to have relatively independent movement during the opening and closing of the handles upon spaced centers, and these links are in turn pivotally connected to a transverse pin 20 which has its ends projecting through slots 21 in the side plates 13 for reciprocation therein. Suitable means are provided on the projecting ends of the pin to prevent its displacement and in the form shown there is a washer 22 on each end held by a corresponding cotter pin 23.

The substantially central and longitudinally disposed links 18 as pivotally connected to pin 20, are in turn pivotally connected through said pin with the inner ends of links 24 which are peculiarly shaped as shown in Fig. 3 of the drawings.

That is, each link has an apertured inner portion 25 of reduced thickness contacting with a corresponding portion of the other link and on either side of the portions 25 are confronting recesses 26 accommodating the forward ends of the links 18 as pivotally connected to the pin 20 and projections 27 are provided having recesses 28 permitting sufficient relative angular movement between the links 24 in the two positions shown in Figs. 2 and 5 of the drawings. The outer or free ends of the links 24 are thus medially located with respect to the thickness of the links, being of reduced thickness and accommodated between the bifurcations 29 of the arms 30 extending outwardly in angular relation from the jaws 31.

Pins 32 pivotally connect the links 24 with the arms 30 and the levers 31 are bifurcated at their angular portions to receive a pressure block 33 therebetween and in such position as to lie equidistant between and parallel to the side plates 13. The block 33 is apertured at its ends for mounting the same on pivots 34 of the jaws 31, the jaws being thus independently pivoted for movement toward and away from each other, while the block 33 is held stationary with its forward edge in a plane below recesses 35 formed centrally in the side plates 13 at their front ends in such a manner as to accommodate the band therein. The pivots 34 are also in the form of bolts like the pivots 12, the ends thereof projecting through holes in the plates 13 and having reduced threaded portions engaged by nuts 36. This construction forms a jaw operating toggle mechanism by which great power may be applied to the jaws.

For the purpose of producing a seal joint which may be of the character set forth in the Flora and Leslie patents previously mentioned, the jaws 31 are provided with overhanging lips 37 and the deforming faces of the jaws each have cylindrical deforming pins 38 partially received within bores 39 formed in the opposite faces of the jaws and substantially axially aligned when the jaws are closed. Each of the pins has a curved forwardly extending deforming surface 40 adjacent the inner face of each jaw lip 37, the curvature being transversely of the jaws. The inner portions of the pins are recessed or undercut as indicated at 41 and the inner sides are beveled as indicated at 42 to accommodate the pressure block 33 and permit the necessary pivotal movements of the jaws together with the deforming pins carried thereby. Passages 43 axially aligned with the bores 39 through the outer walls of the jaws, are provided to facilitate removal of the pins by introduction of a punch or similar tool therethrough in case it is necessary to replace the pins should they become excessively worn or broken.

In the use of the sealing tool, it is placed over the object O to be bound by the band or strap S which has been arranged to encircle the object as indicated in Fig. 1 of the drawings. The ends of the band are arranged in overlapping relation with or without a sleeve M positioned over the overlapping ends. The handles 10 are then spread apart to position the toggle mechanism and jaws as indicated in Fig. 2 with the jaws in open position. The overlapping ends of the band are then engaged between the jaws as shown in Fig. 1 and the handles are moved together as indicated in Figs. 1 and 5, limited by the stops 44 opposing each other and projecting inwardly at the inner sides of the handles near their outer or free ends to abut against each other and prevent further inward movement of the handles than is necessary, to bring the lips of the jaws into substantial meeting contact, but preferably slightly spaced from each other.

As the jaws close, the overhanging lips 37 thereof will first underlie or engage under the overlapped band ends and sleeve, holding these parts against movement. Further closing movement of the jaws while the parts are thus confined, will cause the deforming pins to engage the opposite edges of the overlapping ends of the band or said ends together with the sleeve positioned thereon, when a sleeve is used, thus deforming the band ends and sleeve in a manner shown in Figs. 8 and 9 of the drawings.

The recesses 41 and the beveled surfaces 42, together with the space between the convex deforming surfaces 40 of the pins 38, will accommodate the joint up to the pressure block 33, thus holding the band ends and the sleeve in contact. This operation is repeated for any number of deformations which it is desired to produce, the jaws being opened by spreading the handles to free the tool of the joint in each instance.

It will be seen that when the handles are disposed toward each other in the deforming position as shown in Figs. 1 and 5, the arms 17 are swung into angular relation between the side plates, thus shifting the links 18 forwardly and causing the pin 20 to ride in the slots 21 from the rear or inner ends thereof as shown in Fig. 2 to the forward ends thereof as shown in Figs. 1 and 5. This movement is transmited to the jaws through the links 24 which are caused to move from a substantially right angled position relative to each other to a position substantially in alignment, thus rocking the arms 30 outwardly and swinging the jaws 31 toward each other. Separation of the handles results in imparting opposite movements to the jaw operating toggle mechanism with the extensions or arms 17 projecting rearwardly of the side plates and the pin 20 moving rearwardly in the slots 21, thus drawing on the links 24 and swinging the arms 30 inwardly to spread the jaws 31, in which position the tool may be applied to the band ends and sleeve, if used, or removed therefrom after formation of the seal in the manner already described.

As before stated, the pins or stops 44 limit the movements of the handles and jaws toward each other, but the device is so constructed that the pin 20 engages the ends of the slots 21 to positively limit the movements of the jaws in either direction, that is, in opening and closing. Obviously other equivalent means establishing sliding connection between the pin and side plates may be provided, but in any event, the pin 20 engages the forward end of the slot slightly before the stop or pins 44 abut, so as to prevent further movement of the jaws after the joint is completed, thereby preventing the jaws from being forced together beyond that degree required to produce the seal joint, thus avoiding mutilation or cutting of the metal. Furthermore, this limiting means prevents further or excessive strains or stresses from being placed on the pivotal connections and linkage of the toggle mechanism between the handles and jaws. Also, the connections are such that the work is centralized and the pressure of both jaws on the work equalized, the connections between the handles and jaws both being the same, so that the jaws are caused to move in unison or synchronism and to the same degree in both directions over the pressure block or chair 33. This distribution of effort and the known toggle leverage arrangement reduce the handle effort required to produce the joint, and the guiding toggle lever pin, centralizes the motion of the jaws, while the absence of crossed handles avoids twisting action of the sealer head and possible distortion or mutilation of the joint. This is also effected by reason of the distribution of the pressure across the full face of each link and the use of the toggle-lever pin 20 as described.

In the initial crimping of the band edgewise, the effort required is greatest and the curve quickly reaches a high point and then recedes, the degree depending upon the width and gauge of the metal band or strap and the sleeve, and then the effort increases in a substantially uniformly and comparatively sharply increasing curve until the high point is reached, say from about 750 to 1500 pounds up to about 2300 or 3000 pounds in the initial effort, and then in the receded position, from about 1300 or 2300 pounds to 3500 up to 3500 or 7200 pounds. With the arrangement described, the initial handle effort increases and recedes on about the same curve, but after this, the manual effort only increases slightly and then continues for the remainder of the operation or stroke on a slightly wavering but substantially uniform curve, thereby greatly reducing the manual effort required to produce the joint and resulting in a comparatively even distribution of the effort required on the handles to accomplish the uneven work done at the jaws with a relatively smooth effort curve.

Furthermore, the distribution of the speed of motion of the jaws in relation to the handles is such that no handle stroke is wasted when the jaws are not doing work, that is, when the pressure is not being applied, and the motion of the handles is increased with relation to the motion of the jaws when the work to be done by the jaws increases.

Furthermore, by reason of the pin 20 engaging the forward ends of the slots 21, the movements of the levers and links is positively prevented beyond that point required to complete the joint, and by reason of the contact of the links 24 with the pressure block or chair 33, as shown more particularly in Fig. 5 of the drawings, and the engagement of the opposed shoulders of the links forming stops in this position of the parts, positive prevention of overload is accomplished.

This avoids excessive strains on the parts, since it is obvious that a very great leverage or tremendous multiplication of power may be applied by reason of the lengths of the handles and the toggle arrangement as described and the application of this leverage or power beyond the limiting movement if effective, in the last degree or two of the closing movement would be sufficient to destroy the tool, whereas such action is entirely eliminated.

Furthermore, by reason of the toggle arrangement and leverage as described, a variable distribution of effort is required, since whereas the crimping effort applied at the jaws increases, the manual effort applied to the handles continues relatively constant after initial crimping operation. This is also made possible by using the linkage as described and facilitates the application of the proper power or force to surmount the high point on the curve known as the "break", or the initial effort required to start the seal forming. Of course, in the wider straps especially of thicker gauge, this break is more pronounced.

The invention is not limited to the particular construction disclosed wherein the jaws are at the front, as the same construction is capable of wide adaptation of special uses by changing the jaws, handles, levers and side plates. It will also be noted that the use of separate fulcrum points for the two jaws results in each jaw being fulcrumed above and outwardly of the inner faces of the forming pins, so that as the forming pins swing with the jaws to closed position they will pass their lowest position below the chair or pressure block and start to squeeze in toward the chair, thereby giving a powerful compression on the folded joint just prior to the completion of the closing action of the jaws.

It will thus be seen that a front action type of sealing tool is provided by which great pressure may be applied for deforming the band ends together with the sleeve, if used, producing a positive joint or connection between said ends.

While one form of joint has been illustrated, it is not desired to be restricted to the particular form of joint or seal shown. The parts are so constructed that they are practically duplicates of each other, thus reducing the number of parts which it is necessary to manufacture and greatly lessening the cost of production and simplifying assemblage.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. A strap sealing tool comprising a pair of jaw-levers mounted intermediate their ends on spaced fixed pivots and each having a strap deforming means at one side of its pivot and a toggle connection at the other side of its pivot, a pair of toggle links each pivotally connected at one end to one of the toggle connections of one of the jaw-levers and at the other end to a common pivot pin to form a toggle, a pair of handle-levers pivoted at one end on spaced fixed pivots, and links connecting the free ends of the handle levers to said common pivot pin.

2. A sealing tool for joining overlapped portions of metallic package-binding strap comprising a pair of spaced side plates each having a straight passageway with both ends closed, a pair of spaced pivot pins extending between and carried by the side plates, a movable jaw on each pivot pin, a pressure block rigidly carried by the pivot pins between the jaws, a pair of operating handles pivotally mounted between the side plates, links connected to the handles, and operative connections between the links and both jaws, said connections including a pin slidable in the side plate passageways and limited in its movement in both directions by the closed ends of the passageways whereby the movements of the handles and jaws are limited, parts of said operative connections engaging the pressure block at one extremity of movement to assist said pin and the closed ends of said passageways to limit the movements of the handles and jaws.

3. A strap sealing tool comprising a pair of pivotally mounted jaw levers each having strap deforming means at one end and a toggle connection at the other end, a pair of toggle links each connected at one end to a toggle connection of a jaw lever, a common pivot pin to which the other ends of both toggle links are connected, a pair of pivoted handle levers, and a link connecting each handle lever to the common pivot pin.

4. A strap sealing tool comprising a pair of handle levers mounted on spaced fixed pivots and having operating ends which move past one another, a pair of links each connected at one end to the operating end of one of the handle levers, a common pivot pin to which the other ends of both of said links are connected, a pair of pivotally mounted jaw levers each having a strap deforming means at one end and a toggle connection at the other end, and a second pair of links each connected at one end to a toggle connection of a jaw lever and both connected at the other end to said common pivot pin.

RUSSELL T. EDWARDS.